United States Patent
Cromer et al.

(10) Patent No.: US 7,191,464 B2
(45) Date of Patent: Mar. 13, 2007

(54) METHOD AND SYSTEM FOR TRACKING A SECURE BOOT IN A TRUSTED COMPUTING ENVIRONMENT

(75) Inventors: Daryl Carvis Cromer, Apex, NC (US); Joseph Wayne Freeman, Raleigh, NC (US); Steven Dale Goodman, Raleigh, NC (US); Eric Richard Kern, Durham, NC (US); Randall Scott Springfield, Chapel, NC (US)

(73) Assignee: Lenovo Pte. Ltd., Singapore (SG)

( * ) Notice: Subject to any disclaimer, the term of this patent is extended or adjusted under 35 U.S.C. 154(b) by 1188 days.

(21) Appl. No.: 09/978,381

(22) Filed: Oct. 16, 2001

(65) Prior Publication Data

US 2003/0074548 A1 Apr. 17, 2003

(51) Int. Cl.
*H04L 9/32* (2006.01)
*G06F 15/177* (2006.01)

(52) U.S. Cl. ................... 726/2; 713/1; 713/2
(58) Field of Classification Search .......... 713/1, 713/2, 188, 158, 194, 200, 201, 100, 14; 711/100, 163, 164, 170, 173; 710/8, 10, 710/104; 718/107; 365/185.04, 189.07; 726/2

See application file for complete search history.

(56) References Cited

U.S. PATENT DOCUMENTS

| | | | |
|---|---|---|---|
| 5,325,532 A | | 6/1994 | Crosswy et al. |
| 5,359,659 A | * | 10/1994 | Rosenthal .................. 713/200 |
| 5,379,342 A | | 1/1995 | Arnold et al. |
| 5,421,006 A | * | 5/1995 | Jablon et al. ................. 714/36 |
| 5,634,137 A | | 5/1997 | Merkin et al. |
| 6,018,629 A | | 1/2000 | Tojima |
| 6,158,000 A | | 12/2000 | Collins |
| 6,205,558 B1 | | 3/2001 | Sobel |
| 6,209,089 B1 | | 3/2001 | Selitrennikoff et al. |
| 6,263,431 B1 | * | 7/2001 | Lovelace et al. .............. 713/2 |
| 6,643,725 B1 | * | 11/2003 | Kozakai et al. ............ 710/300 |
| 2003/0061494 A1 | * | 3/2003 | Girard et al. ............... 713/189 |

* cited by examiner

*Primary Examiner*—Hasuk Song
*Assistant Examiner*—Joseph Pan
(74) *Attorney, Agent, or Firm*—Sawyer Law Group LLP (57) ABSTRACT

A method, system and computer readable medium containing programming instructions for tracking a secure boot in a computer system having a plurality of devices is disclosed. The method, system and computer readable medium include providing an embedded security system (ESS) in the computer system, wherein the ESS includes at least one boot platform configuration register (PCR) and a shadow PCR for each of the at least one boot PCRs, initiating a platform reset to boot the computer system via BIOS, and, for a device booted, generating a measurement value for the device and extending that value to one of the at least one boot PCRs and its corresponding shadow PCR. The system, method and computer readable medium of the present invention also includes comparing the measurement values of the boot PCRs to their corresponding shadow PCRs, whereby the computer system is trusted if the measurement values match.

29 Claims, 7 Drawing Sheets

METHOD AND SYSTEM FOR TRACKING A SECURE BOOT IN A TRUSTED COMPUTING ENVIRONMENT

FIELD OF THE INVENTION

The present invention relates generally to computer systems and, more particularly, to providing a trusted and secure computing platform.

BACKGROUND OF THE INVENTION

With the advent of personal computer system use in every day business transactions, the issue of computer security has become critical. Unsecured personal computers inhibit electronic business (e-business) because users are reluctant, justifiably so, to transmit highly personal and sensitive information to system which may be vulnerable to intruders or viruses. While many personal computer (PC) manufacturers have made individual strides towards increasing security by adding "smart cards" or embedded security chips to their new models, the lack of a concerted effort by the PC industry to develop security technology could prevent the evolution of this technology in a consistent and compatible way between manufacturers.

Recognizing this potential risk and the adverse effects it could have on inhibiting electronic commerce, an open alliance between major PC manufacturers was formed to develop and propose a standard that would adopt hardware and software technologies to strengthen security at the platform level. The open alliance, known as the Trusted Computing Platform Alliance (TCPA), has proposed a standard including new hardware, BIOS and operating system specifications so PC manufacturers can provide a more trusted and secure PC platform based on common industry standards, the details of which are provided in the TCPA PC Specific Implementation Specification, Version 1.00 RC1 (Aug.16, 2001) (http://www.trustedpc.org), hereby incorporated by reference.

Figure 1:
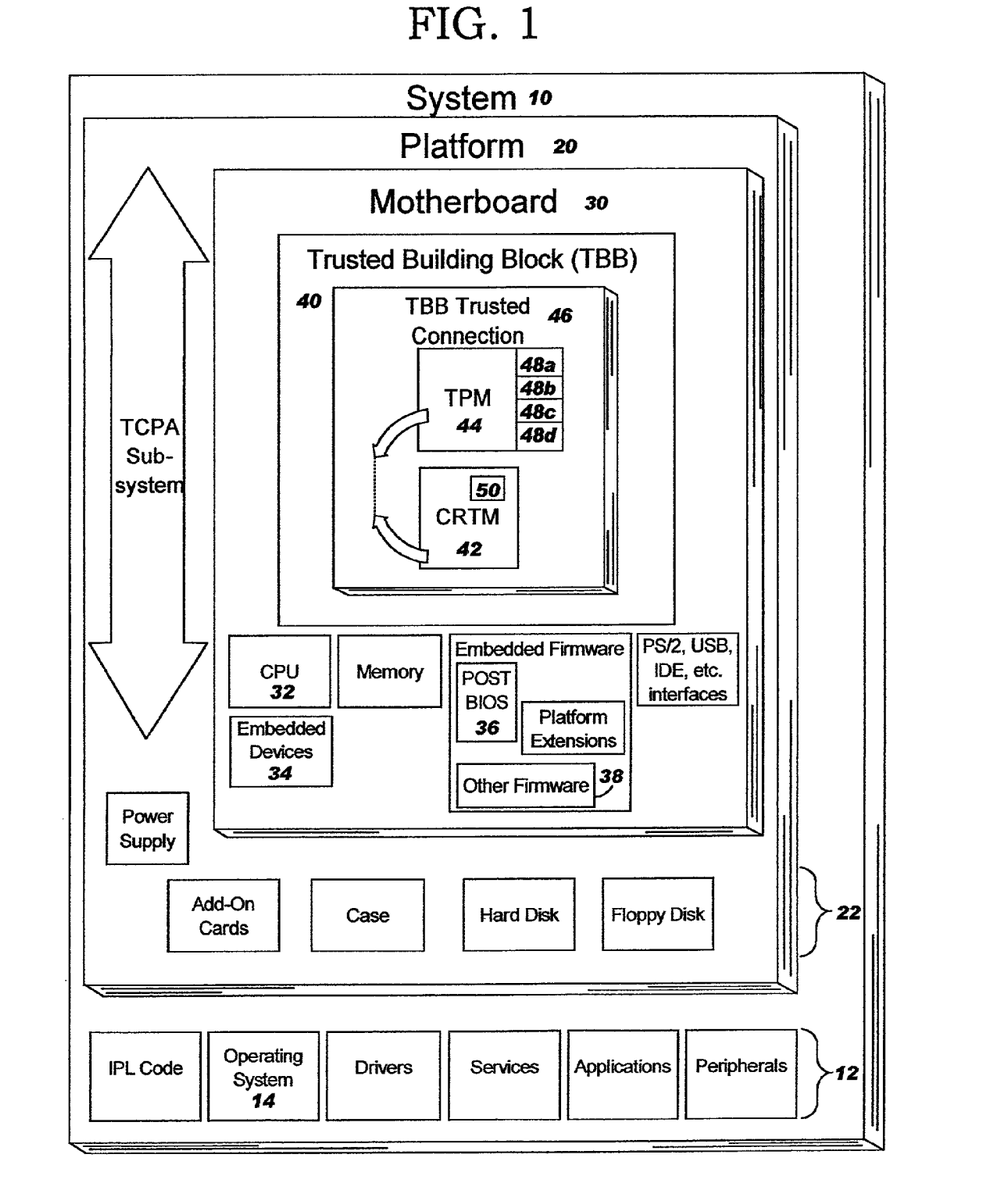
FIG. 1 illustrates a block diagram of a trusted computer system that can be used in accordance with the preferred embodiment of the present invention.

FIG. 1 is a block diagram illustrating a trusted platform in accordance with TCPA standards. As is shown, the PC architecture includes a system 10, platform 20, motherboard or planar 30, and trusted building block (TBB) 40. The system 10 includes the platform 20 and all post-boot components 12, including an operating system 14, that comprise the entire entity that performs actions for, or acts on behalf of, a user. The platform 20 presents and receives information to and from the user. The platform 20 includes the motherboard 30 and peripherals 22 attached to motherboard 30.

The motherboard 30 is provided by the manufacturer and includes one or more CPUs 32 and all primary peripheral devices 34, i.e., devices which directly attach to and directly interact with the CPU 32. In addition, the motherboard 30 includes all BIOSes 36 and the TBB 40. The TBB 40 is the center of the trusted platform, and includes a Core Root of Trust for Measurement (CRTM) 42, a Trusted Platform Module (TPM) 44, and a trusted connection 46 of the CRTM 42 and TPM 44 to the motherboard 30.

According to the TCPA specification, the CRTM 42 and the TPM 44 are the only trusted components on the motherboard 30, i.e., they are presumably secure and isolated from tampering by a third party vendor or software. Only the authorized platform manufacturer (or agent thereof) can update or modify code contained therein. The CRTM 42 is the executable component of the TBB 40 that gains control of the platform 20 upon a platform reset. Thus, for all types of platform resets, the CPU 32 always begins executing code with the CRTM's 42 platform initialization code. The trust in the platform is based on the CRTM 42, and trust in all measurements is based on its integrity.

The basic premise underlying the trusted platform is ensuring that untrusted devices or software have not been loaded onto the system. Trust is established during a pre-boot state that is initiated by a platform reset. The platform reset can either be a cold boot (power-on), a hardware reset, or a warm boot typically caused by a user keyboard input. Following a platform reset, the CPU 32 executes code with the CRTM's 42 platform initialization code. The chain of trust begins at the CRTM 42.

In this architecture, the BIOS includes a Boot Block 50 and a POST BIOS 36. The Boot Block 50 and the POST BIOS 36 are independent components and each can be updated independent of the other. The Boot Block 50 is located in the CRTM 42, while the POST BIOS 36 is located outside the TBB 40. Thus, while the manufacturer or a third party supplier may update, modify or maintain the POST BIOS 36, only the manufacturer can modify or update the Boot Block 50. In a variation of the architecture, the entire BIOS is a single entity located entirely within the CRTM 42.

As stated above, the CRTM 42 and TPM 44 are presumptively trusted. Thus, following a platform reset, code in the Boot Block 50 is executed, which measures the entity to which it will transfer control, in this case, the Post BIOS 36. "Measuring an entity" means hashing code in the entity to produce a log of the code, which is then extended into a platform configuration register (PCR) 48 in the TPM 44. The TPM 44 includes a plurality of PCRs 48, a portion of which are designated to the pre-boot environment and referred to collectively as boot PCRs 48a. Each boot PCR 48a is dedicated to collecting specific information related to a particular stage of a boot sequence. For example one boot PCR 48a (PCR[0]) stores measurements from the CRTM 42, POST BIOS 36, and all firmware 38 physically bound to the motherboard 30.

Once the POST BIOS 36 has been measured, control is transferred to the POST BIOS 36, which then continues to boot the system by ensuring that hardware devices are functional. Once POST BIOS 36 gains control, it is responsible for measuring any entity to which it will transfer control. As the POST BIOS 36 progresses through the boot sequence, values in the boot PCRs 48a increment whenever an entity is measured.

Upon booting to the operating system (OS) 14, the operating system 14 verifies the trustworthiness of the platform 20 by comparing the values in the boot PCRs 48a with precalculated values known by the operating system 14. If the values match, the operating system 14 is assured of a secure boot and that the platform is trusted. If the values do not match, the operating system 14 is alerted of a possible breach, and the operating system 14 can take measures to reestablish trust.

Figure 2A:
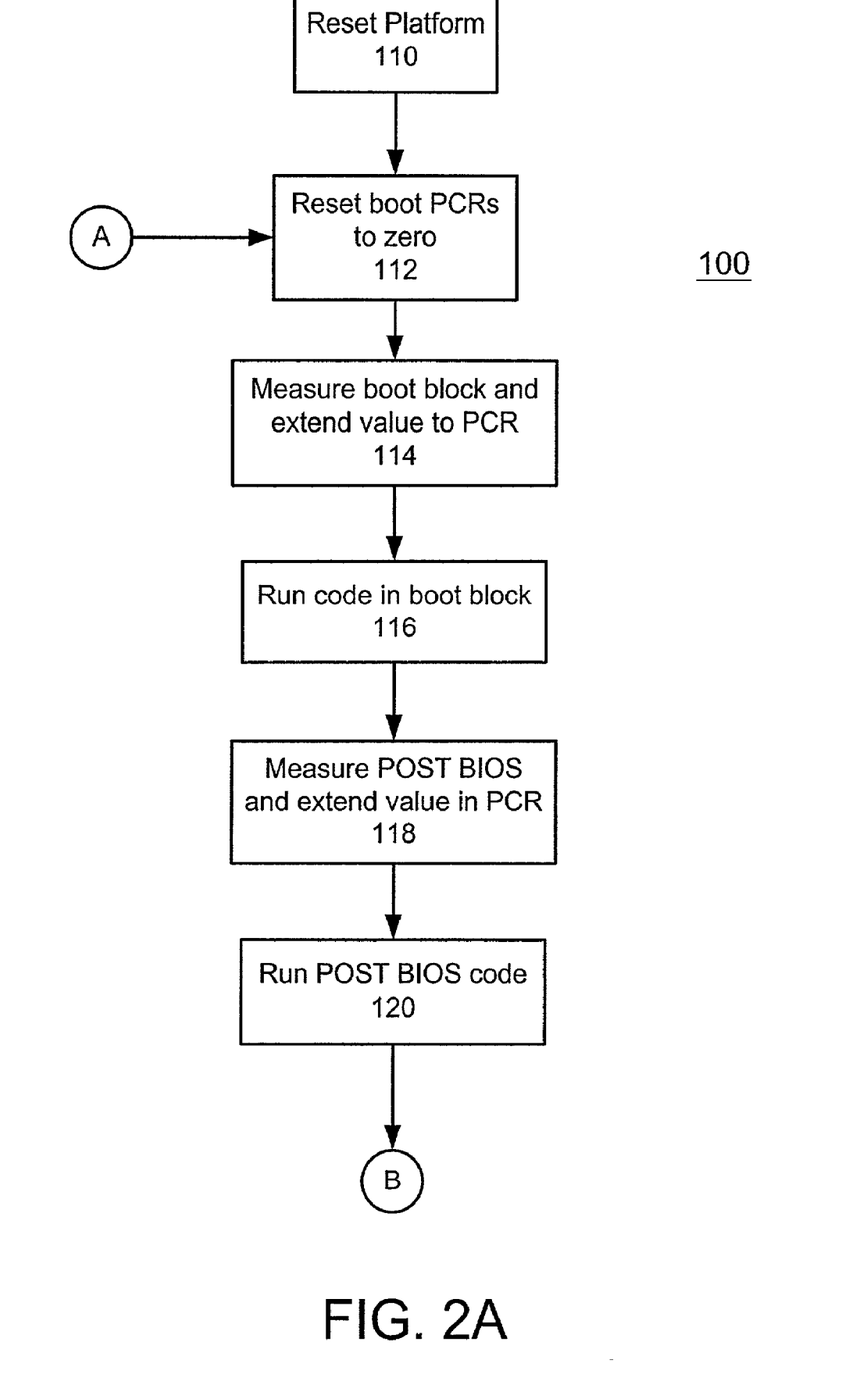
FIGS. 2A and 2B illustrate a flowchart of a process for booting the trusted computer system in accordance with a TCPA trusted model.
Figure 2B:
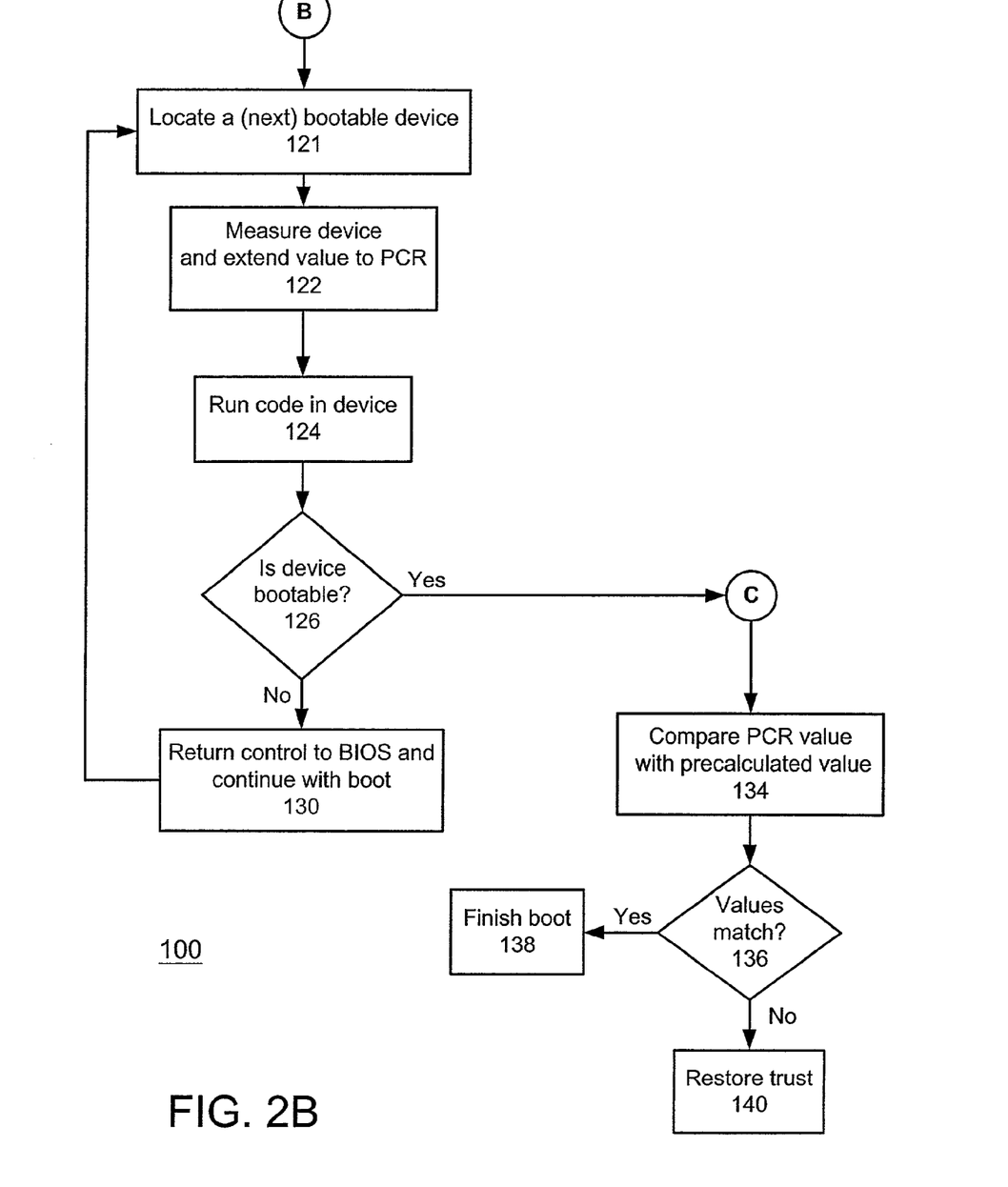

In FIGS. 2A and 2B, a flowchart illustrating a conventional boot sequence 100 in accordance with the TCPA trust model is presented. The process 100 begins when the platform 20 is reset in step 110, e.g., the computer is powered-up. In step 112, all boot PCRs 48a are reset to zero. Before the code in the Boot Block 50 is executed, the code may be measured, i.e., hashed to produce a log, which is then extended to the appropriate boot PCR 48a, via step 114. Then, in step 116, the code in the Boot Block 50 is run, which passes control over to the POST BIOS 36. Nevertheless, before executing the code in the POST BIOS 36, that code is also hashed and extended to the boot PCR 48a in step 118. Then, in step 120, the code in the POST BIOS 36 is run.

Referring now to FIG. 2B, the process 100 continues at number B. The POST BIOS 36 locates any bootable devices in step 121 by reading each bootable device and attempting to find a valid boot record. When a valid boot record is discovered, the POST BIOS 36 measures the device and extends the value to the boot PCR 48a in step 122. Thereafter, in step 124, the code in the device is run. If this code determines that the boot is not a bootable device in step 126, control is then returned to the POST BIOS 36 to continue the booting sequence, via step 130.

If the device is a bootable device (step 126), an operating system 14 has presumably been booted, and the process 100 continues at number C. This part of the process verifies the trustworthiness of the boot sequence. As explained above, each component is measured, i.e., the code in each device is hashed and extended to the appropriate boot PCR 48a. Thus, the values in the boot PCRs 48 reflect the boot sequence from beginning to end. In step 134, the operating system compares the value in each boot PCR 48a to a precalculated value that reflects a trustworthy boot sequence. The precalculated value is typically calculated by the operating system 14, which is aware of all trusted components.

If the boot PCR 48 values are not equal to the precalculated value calculated by the operating system 14 (step 136), the operating system 14 will initiate security checks to restore trust (step 140). The operating system 14 may examine the boot process to determine whether a security breach has occurred, for instance, by launching a virus detection program.

As stated above, upon a platform reset, all boot PCRs 48a are reset to zero. This presents an opportunity for an intruder to load rogue software and/or data onto the system, via a removable media, such as a CDROM, without detection. All the intruder needs do is perform a warm boot, e.g. depressing <ctrl><alt><del>, after he or she has booted the rogue software and/or data and has used the computer. Any indication of the rogue software and/or data being loaded would be eliminated because the boot PCR 48a values would be reset to zero. The next boot sequence booting to the trusted operating system 14 (on hard file) would result in trusted boot PCR 48a values, and the trusted operating system 14 would be oblivious to a potential breach of security resulting from the rogue operating system which ran previously.

Accordingly, a need exists for a method and system for recording and tracking events occurring over multiple boot sequences. The present invention addresses such a need.

SUMMARY OF THE INVENTION

The present invention provides a method, system and computer readable medium containing programming instructions for tracking a secure boot in a trusted computer system having a plurality of devices. The method, system and computer readable medium include providing an embedded security system (ESS) in the computer system, wherein the ESS includes at least one boot platform configuration register (PCR) and a shadow PCR for the boot PCRs, initiating a platform reset to boot the computer system via BIOS, and, for each device booted, generating a measurement value for the device and extending that value to one of the at least one boot PCRs and its corresponding shadow PCR.

Through aspects of the present invention, the shadow PCR will not be reset to zero when the boot PCRs are reset. This shadow PCR can only be reset by a trusted OS. Using this methodology, the shadow PCR can be used to track whether untrusted code has been executed on the system.

The system, method and computer readable medium of the present invention also includes comparing the measurement values of the boot PCRs to their corresponding shadow PCRs, whereby the computer system is trusted if the measurement values match.

DETAILED DESCRIPTION

The present invention relates generally to computer systems and, more particularly, to a method and system for providing a trusted and secure computing platform. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 3:
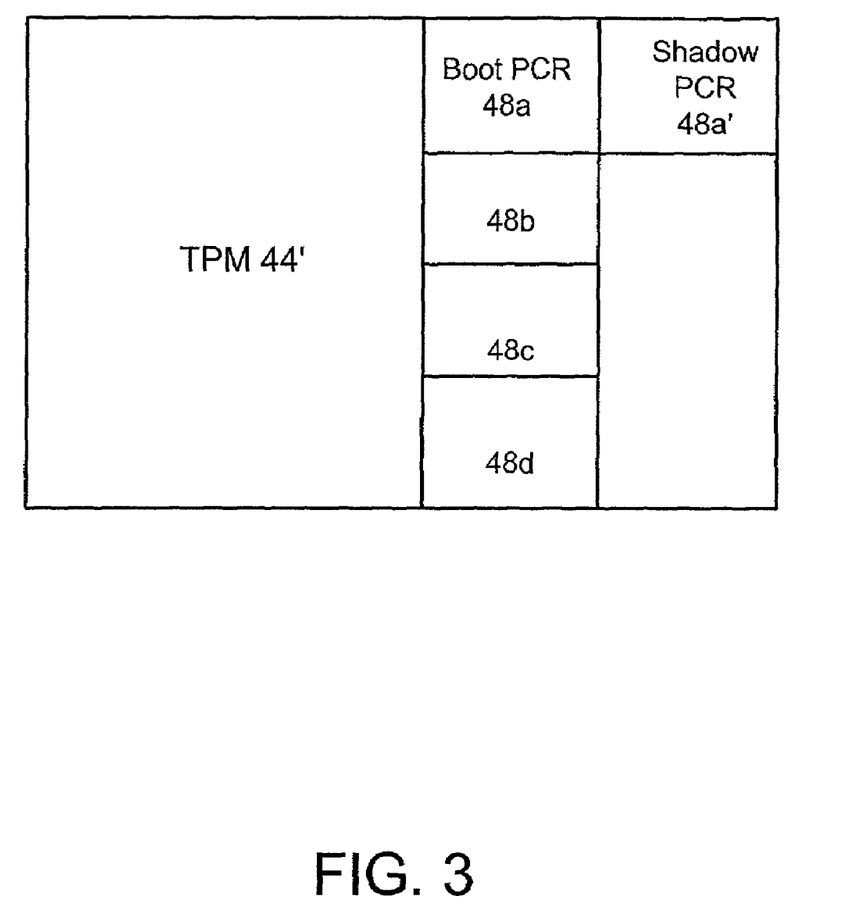
FIG. 3 illustrates a TPM in accordance with the method and system of the present invention.

FIG. 3 illustrates a TPM in accordance with the method and system of the present invention. As is shown, the TPM 44' includes a plurality of shadow PCRs 48a' that are linked, one-to-one, to the plurality of boot PCRs 48a. During the boot sequence, measurements from each component are extended to the boot PCRs 48a and to the corresponding shadow PCRs 48a'. Each shadow PCR 48a' corresponds directly to each boot PCR 48a. Upon a platform reset, the boot PCRs 48a reset to zero, but the shadow PCRs 48a' retain their respective values. Thus, if an intruder boots rogue software and/or data from a removable medium, and performs a platform reset, the boot PCR 48a values reset to zero, but the shadow PCRs 48a' do not. The ensuing boot sequence, which again measures each bootable device and extends those values to the boot PCRs 48 and shadow PCRs 48a', will result in boot PCR 48a values that differ from the shadow PCR 48a' values. This indicates that unauthorized software or another operating system was booted since the last time the trusted operating system 14 was booted and prompts the trusted operating system 14 to take measures to restore trust.

Figure 3A:
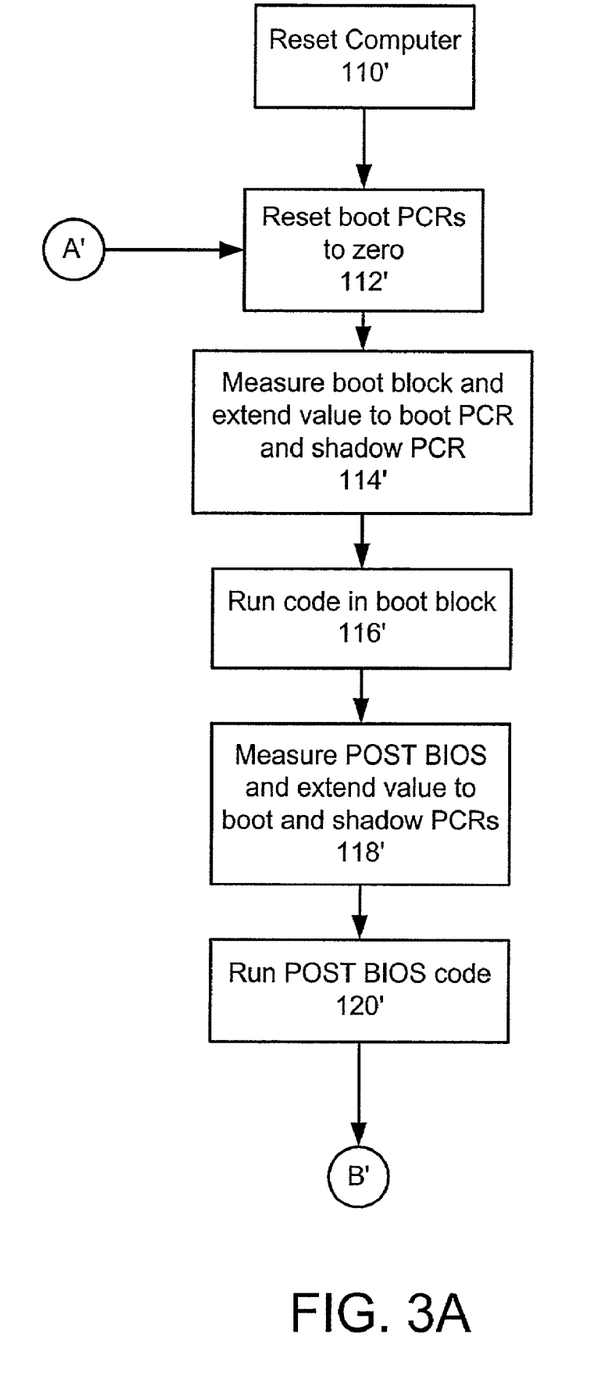
FIGS. 3A, 3B and 3C illustrate a flowchart of a process for booting the system in accordance with a preferred embodiment of the present invention.
Figure 3B:
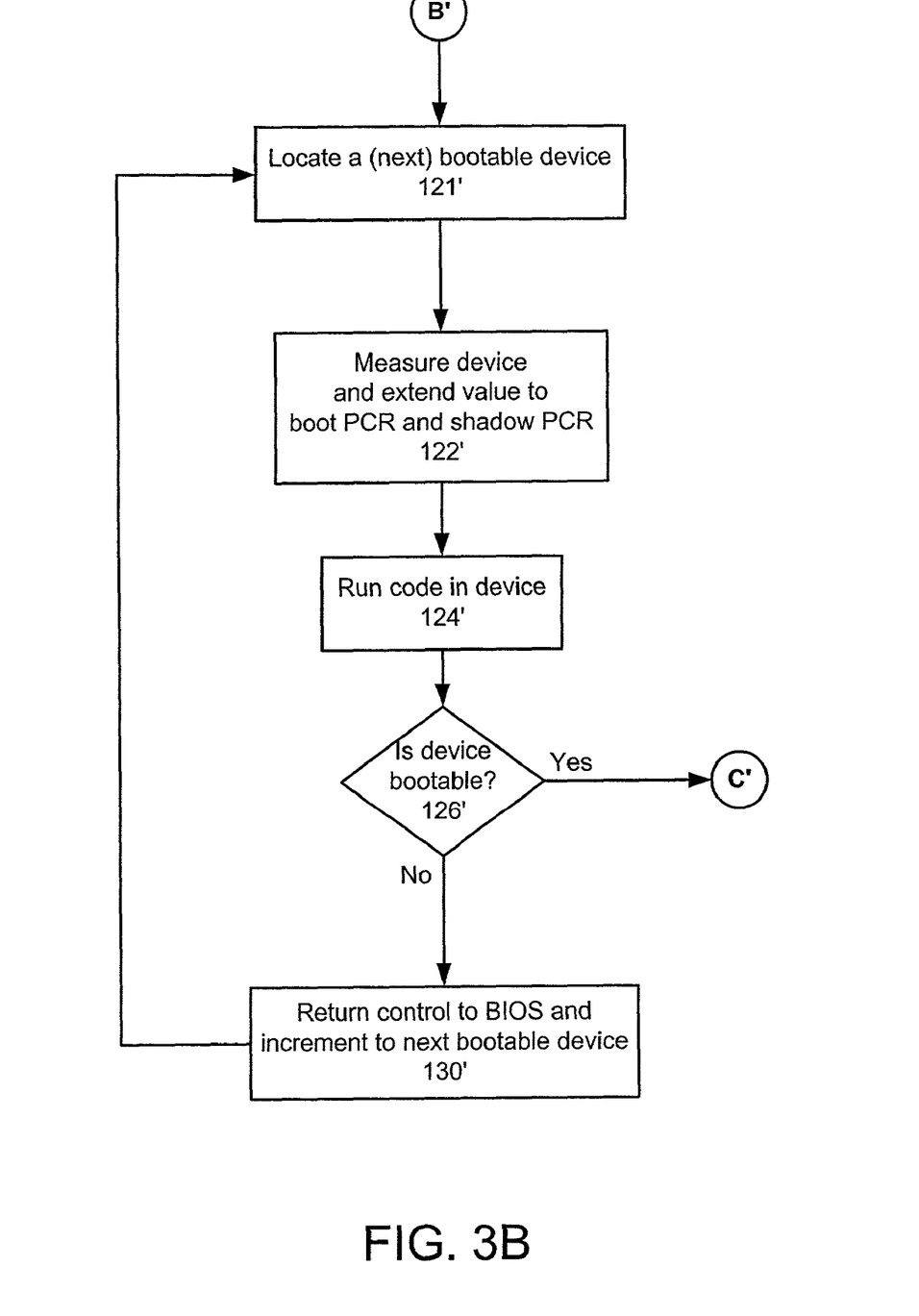
Figure 3C:
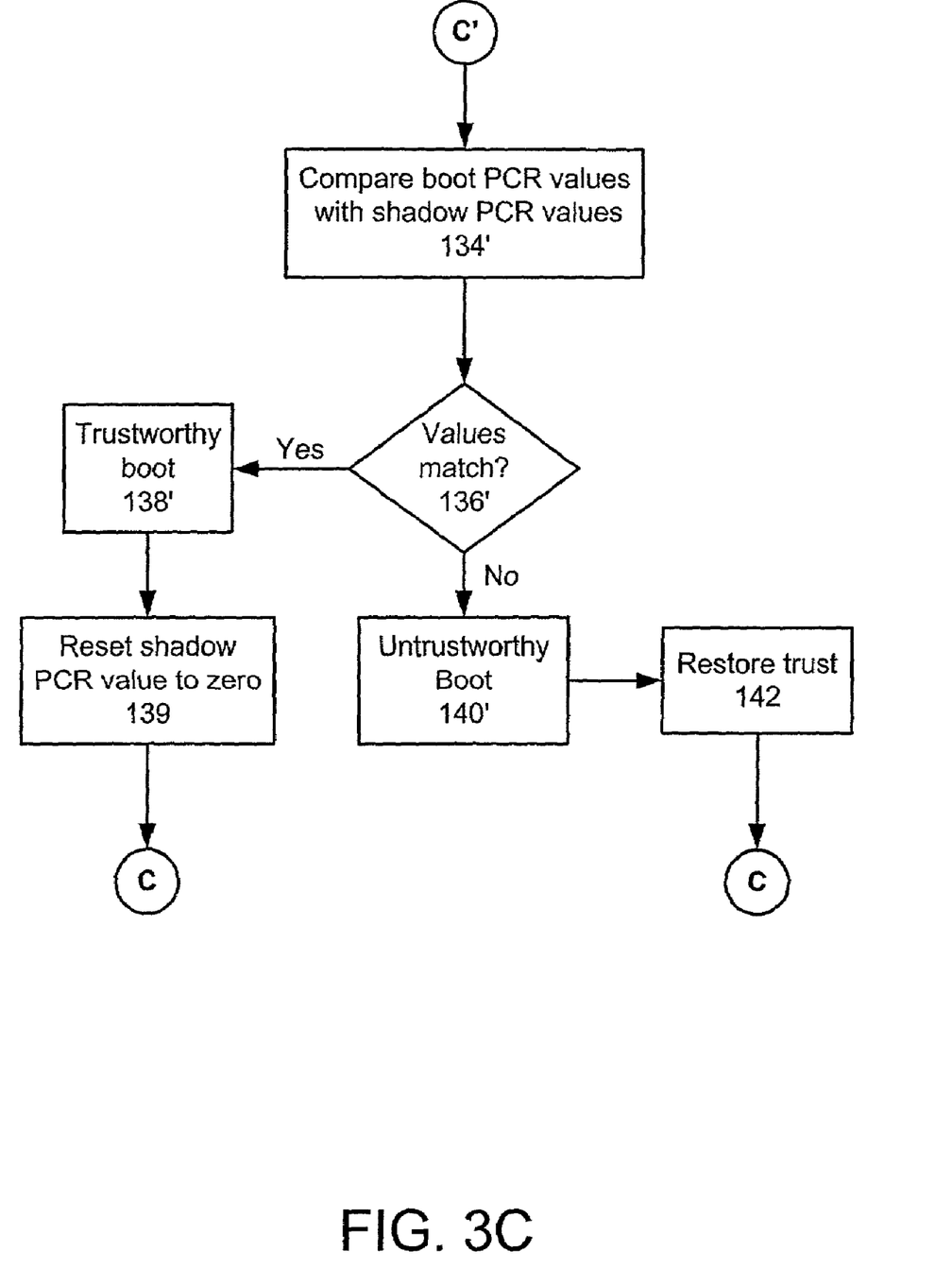

FIGS. 3A, 3B and 3C illustrate a process in accordance with a preferred embodiment of the present invention. Referring first to FIG. 3A, the process begins as before, with a platform reset (step 110'), and resetting the boot PCRs 48a to zero in step 112.' Note that only the boot PCRs 48a are reset. The shadow PCRs 48a' are not reset and retain their respective values. In step 114,' the Boot Block 50 is measured and extended to the boot PCR 48a, as well as, to the corresponding shadow PCR 48a.' Because the shadow PCR 48a' has retained its value from the previous boot, the extended value from the Boot Block 50 augments any value that may have been there previously. After measuring the Boot Block 50, the process continues by running the code in the Boot Block 50, which passes control to the POST BIOS 36 (step 116'). As is seen in steps 118' to 122,' each time a device is measured, the values are extended to both the boot PCR 48a and its corresponding shadow PCR 48a.'

Once the trusted OS is measured and booted, the trustworthiness of the previous boot is checked at number C.' Referring now to FIG. 3C, the values in the boot PCRs 48a are compared to the corresponding values in the shadow PCRs 48a' in step 134'. If the values match (step 136'), the trusted OS 14 is assured that no unauthorized software or rogue operating system has been loaded since the last boot to the trusted OS 14. The trusted OS 14 will then reset the shadow PCRs 48' to zero in preparation for the next boot, via step 139, and proceed through the boot process.

Note that only the trusted OS 14 has the ability to reset the shadow PCRs 48a.' This can be accomplished by sealing their contents to the value in PCR 48a. Since PCR 48a will equal a specific value only if a known trusted OS is loaded, the shadow PCR 48a' will be protected from being reset. An encryption key known only to the trusted OS 14 or any other means well known to those skilled in the art can also be used to reset the shadow PCR 48a'. Thus, rogue software is prevented from resetting the shadow PCRs 48a.'

If, on the other hand, the boot PCR 48a values do not match the shadow PCR values 48a,' the trusted OS 14 is alerted to a breach in trust during a previous boot. The difference in values could occur, for example, if a rogue operating system was booted from a removable medium, such as a CDROM. In that situation, the POST BIOS 36 would still measure each device and extend values in the boot PCRs 48a and shadow PCRs 48a.' At the end of the boot sequence the boot PCRs 48a and the shadow PCRs 48a' would contain values. At the next platform reset, the boot PCR 48a values will automatically be reset to zero, but because the rogue operating system cannot reset the shadow PCRs 48a,' the shadow PCRs 48a' will retain their values. Thus, at the end of the next boot, the boot PCR 48a values will necessarily differ from the shadow PCR 48a' values.

If the trusted OS 14 detects a breach in trust (e.g., step 140'), it will initiate operations to restore trust in the platform, via step 142. For instance, because each boot PCR 48a represents a different part of the boot process, the trusted OS 14 may be able to determine what has happened from examining each boot PCR 48a. If the trusted OS 14 determines that an unknown application or operating system was previously booted, the trusted OS 14 could perform certain preventative operations or security tasks, such as launching a virus detection program.

Through the method and system of the present invention, the trusted OS 14 can determine whether the computer has booted to a trusted or nontrusted source. By storing information in the TPM 44, the computer is able to track and record previous boot activity in a secure and private manner. Thus, the method and system of the present invention enhances security in the TCPA compliant platform.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for tracking a secure boot in a computer system, wherein the computer system comprises a plurality of devices, the method comprising the steps of:
   (a) providing an embedded security system (ESS) in the computer system, wherein the ESS includes at least one boot platform configuration register (PCR) and a shadow PCR for each at least one boot PCR;
   (b) initiating a platform reset to boot the computer system via BIOS;
   (c) generating a measurement value for a device of the plurality of devices booted in the computer system;
   (d) extending the measurement value to one of the at least one boot PCRs and to the corresponding shadow PCR; and
   (e) comparing the measurement value of each of the at least one boot PCRs with the measurement value of the corresponding shadow PCR, wherein the computer system is trusted if the measurement values match.

2. The method of claim 1, wherein the step of providing an ESS (a) further comprises providing a Trusted Platform Module (TPM) in accordance with a Trusted Computing Platform Alliance (TCPA) compliant computer system.

3. The method of claim 1, wherein the initiating step (b) further comprises the step of:
   (b1) resetting the measurement value in each of the at least one boot PCRs to zero;
   (b2) hashing code in the BIOS to produce a BIOS digest value;
   (b3) extending the BIOS digest value to one of the at least one boot PCRs and to the corresponding shadow PCR; and
   (b4) executing the code in the BIOS.

4. The method of claim 3, wherein the generating step (c) further comprises the steps of:
   (c1) hashing code in the device to produce the measurement value for the device.

5. The method of claim 4, wherein the extending step (d) further comprises the step of:
   (d1) executing the code in the device after extending the measurement value; and
   (d2) booting a trusted operating system.

6. The method of claim 5 further comprising the step of:
   (f) performing preventative operations to restore trust in the computer system if the measurement values are different.

7. The method of claim 6, wherein the performing step (f) further comprises the steps of:
   (f1) executing a virus protection program.

8. The method of claim 6 further comprising the step of:
   (g) resetting each of the corresponding shadow PCRs to zero once trust is established in the computer system.

9. The method of claim 8, wherein the resetting step (g) further includes the step of:
   (g1) providing a secure means for resetting the shadow PCRS, whereby only an authorized entity is capable of resetting the shadow PCRS.

10. The method of claim 1, wherein the initiating step (b) further includes the step of:
    (b1) performing one of a cold boot, hardware boot, and warm boot.

11. A computer readable medium containing programming instructions for tracking a secure boot in a computer system, wherein the computer system comprises a plurality of devices, the programming instructions for:
    (a) providing an embedded security system (ESS) in the computer system, wherein the ESS includes at least one boot platform configuration register (PCR) and a shadow PCR for each at least one boot PCR;

(b) initiating a platform reset to boot the computer system via BIOS;

(c) generating a measurement value for a device of the plurality of devices booted in the computer system;

(d) extending the measurement value to one of the at least one boot PCRs and to the corresponding shadow PCR; and (e) comparing the measurement value of each of the at least one boot PCRs with the measurement value of the corresponding shadow PCR, wherein the computer system is trusted if the measurement values match.

12. The computer readable medium of claim 11, wherein the instruction of providing an ESS (a) further comprises providing a Trusted Platform Module (TPM) in accordance with a Trusted Computing Platform Alliance (TCPA) compliant computer system.

13. The computer readable medium of claim 11, wherein the initiating instruction (b) further comprises the instructions for:

(b1) resetting the measurement value in each of the at least one boot PCRs to zero;

(b2) hashing code in the BIOS to produce a BIOS digest value;

(b3) extending the BIOS digest value to one of the at least one boot PCRs and to the corresponding shadow PCR; and (b4) executing the code in the BIOS.

14. The computer readable medium of claim 13, wherein the generating instruction (c) further comprises the instructions for:

(c1) hashing code in the device to produce the measurement value for the device.

15. The computer readable medium of claim 14, wherein the extending instruction (d) further comprises the instructions for:

(d1) executing the code in the device after extending the measurement value; and (d2) booting a trusted operating system.

16. The computer readable medium of claim 15 further comprising the instruction for:

(f) performing preventative operations to restore trust in the computer system if the measurement values are different.

17. The computer readable medium of claim 16, wherein the performing instruction (f) further comprises the instruction for:

(f1) executing a virus protection program.

18. The computer readable medium of claim 16 further comprising the instruction for:

(g) resetting each of the corresponding shadow PCRs to zero once trust is established in the computer system.

19. The computer readable medium of claim 18, wherein the resetting instruction (g) further includes the instruction for:

(g1) providing a secure means for resetting the shadow PCRs, whereby only an authorized entity is capable of resetting the shadow PCRs.

20. The computer readable medium of claim 11, wherein the initiating instruction (b) further includes the instruction for:

(b1) performing one of a cold boot, a hardware boot, and a warm boot.

21. A system for tracking a secure boot in a computer system, wherein the computer system comprises a plurality of devices, the system comprising:

a processor in the computer system;

an embedded security system (ESS) coupled to the processor via a secure bus, wherein the ESS includes at least one boot platform configuration register (PCR) and a shadow PCR for each at least one boot PCR;

a BIOS coupled to the processor for booting a device of the plurality of devices in the computer system;

wherein the BIOS generates a measurement value for the device of the plurality of devices and extends the measurement value to one of the at least one boot PCRs and to the corresponding shadow PCR, and wherein the measurement values of the at least one boot PCRs is compared to the measurement values of the corresponding shadow PCRs to determine whether the computer system is trusted.

22. The system of claim 21, wherein the ESS comprises a Trusted Platform Module (TPM) in accordance with a Trusted Computing Platform Alliance (TCPA) compliant computer system.

23. The system of claim 21, wherein the measurement value in the at least one boot PCRs are reset to zero at initiation of a boot sequence, and wherein prior to executing code in the BIOS, BIOS code is hashed to produce a BIOS digest value, which is extended to one of the at least one boot PCRs and the corresponding shadow PCR.

24. The system of claim 23, wherein the BIOS generates the measurement value for the device by hashing code in the device.

25. The system of claim 24, wherein after the measurement value has been extended, a trusted operating system is booted by executing the code in the device.

26. The system of claim 25, wherein the trusted operating system compares the measurement values of the at least one boot PCRs and the corresponding shadow PCRS, and performs preventative operations to restore trust in the computer system if the measurement values differ.

27. The system of claim 26, wherein the trusted operating system launches a virus protection program if the measurement values differ.

28. The system of claim 26, wherein the trusted operating system resets each of the corresponding shadow PCRs to zero once trust is established in the computer system.

29. The system of claim 28 further comprising:

means for allowing only the trusted operating system to reset the shadow PCRs.

* * * * *